Feb. 23, 1954   J. W. MARTIN   2,669,731
FOLDING BED OR BUNK
Filed June 9, 1948   2 Sheets-Sheet 2
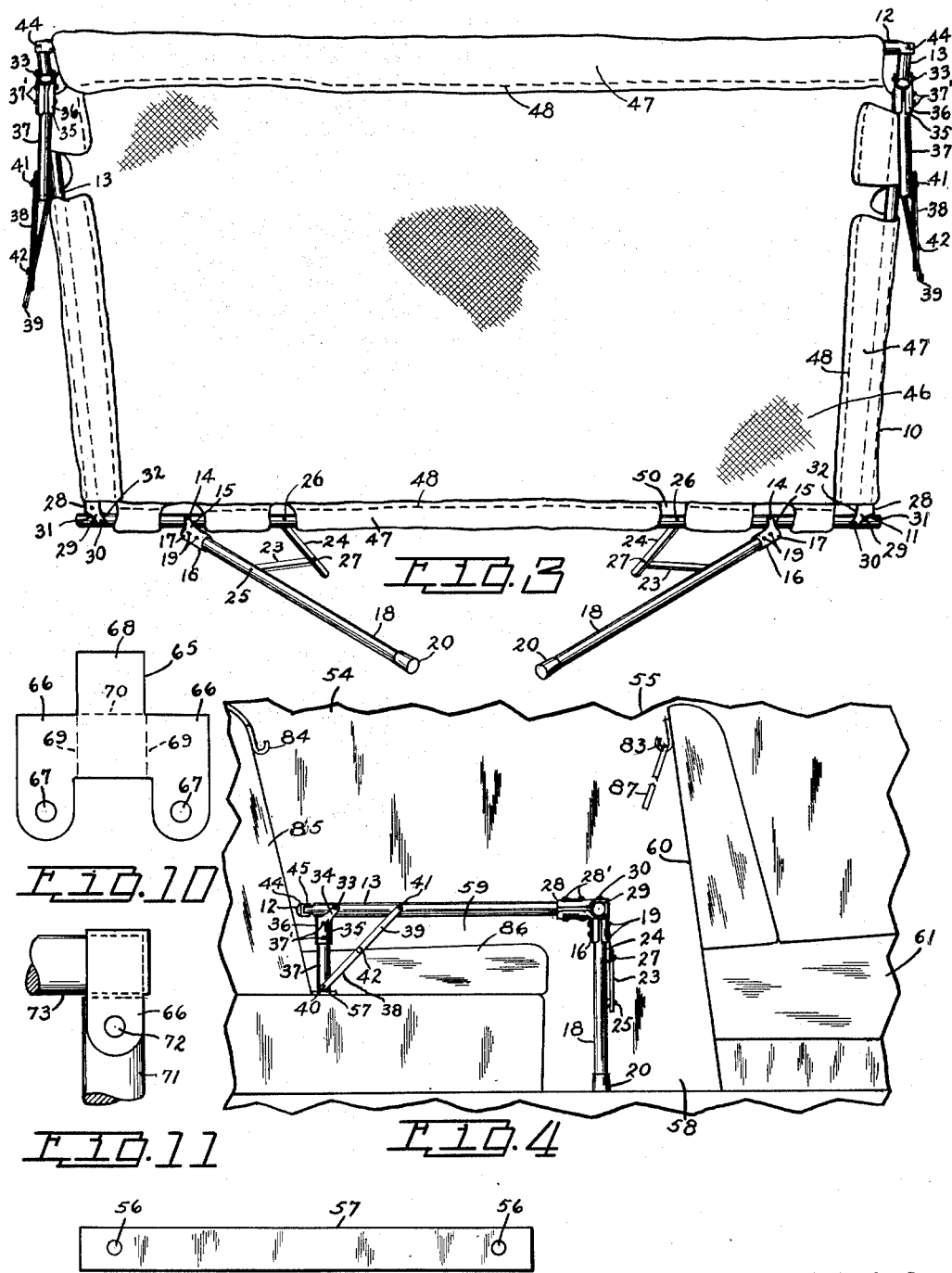
INVENTOR
JOHN W. MARTIN
BY J. B. Dickman Jr.
ATTORNEY Patented Feb. 23, 1954

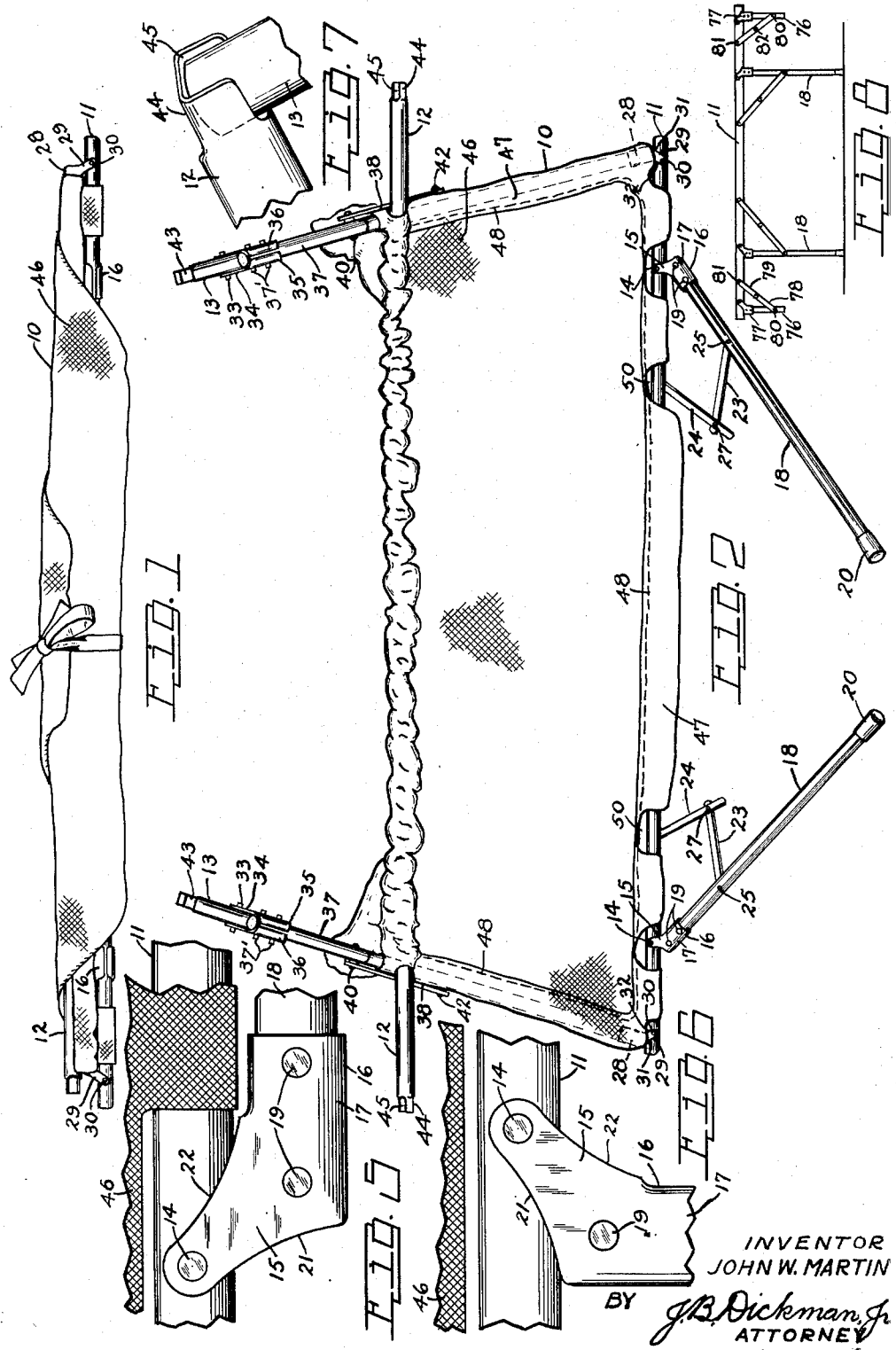

2,669,731

UNITED STATES PATENT OFFICE 2,669,731

FOLDING BED OR BUNK

John W. Martin, Lima, Ohio

Application June 9, 1948, Serial No. 31,862

1 Claim. (Cl. 5—118)

The present invention relates to beds and bunks and particularly to a folding type for use in automobiles, trucks, tents and the like.

It is an object of the present invention to provide a bed or bunk of the folding type, that is light in weight and so designed that when folded it is very compact, requiring very little storage space.

Another object of the present invention is the provision of a folding bed or bunk that is efficient and safe when used in automobiles for children.

A still further object of the present invention is the provision of a bed or bunk that when used in an automobile will not interfere with storage space behind the front seat.

A still further object of the present invention is the provision of a bed or bunk that may be assembled or disassembled with a minimum of effort and within a few minutes.

A still further object of the present invention is the provision of a bed or bunk that is light in weight, rigid in structure and inexpensive to manufacture.

With the foregoing and other objects in view which will appear as the description proceeds, the invention consists of certain novel details of construction and combination of parts hereinafter more fully described and claimed.

In the accompanying drawings:

Figure 1 is a view of the device in a rolled or closed position.

Figure 2 is a bottom view of the device in a partially opened position, the rear legs being shown folded.

Figure 3 is a bottom view of the device, the frame with its covering being shown in its opened position, the legs being partially unfolded.

Figure 4 is a view of the frame per se positioned in the rear seat portion of an automobile, the body of the automobile being shown fragmentarily, the covering being omitted from the frame.

Figure 5 is a top plan view of one of the hinges in folded position, portions being shown fragmentarily.

Figure 6 is a view similar to Figure 5 but showing the hinge in open position, portions being shown fragmentarily.

Figure 7 is a perspective view of my novel socket joint.

Figure 8 is a front elevational view of a modified form of the invention, and illustrating short front legs conforming to the length of the rear legs.

Figure 9 is a top plan view of a transverse base support for the rear legs of the frame.

Figure 10 is a plan view of a modified side rail hinge.

Figure 11 is a side elevational view of the modified side rail hinge formed for reception of a back rail.

In the drawings the numeral 10 represents a folding bed or bunk and it comprises a front rail 11, a back rail 12, and side rails 13, and these rails may be of solid or tubular material, the views illustrated in Figures 2 and 3 being somewhat diagrammatic, the hinge elements being shown in detail in Figures 5 and 6.

To the front rail 11 there is pivotally connected by rivets 14 arm portions 15 of hinge elements 16, the arm portions straddling the rail 11. The hinge elements may be stamped out or they may be cast or molded of any suitable durable material. The body portions 17 of the hinges 16 are rigidly secured to one end of legs 18 by rivets 19, the opposite end of the legs being provided with a rubber cushion cap 20. The portion 21 of the hinge 16 is of an arcuate configuration, and the portion 22 of a modified arc, the arcuate portions being for a purpose to be later described.

The legs 18 are connected to the front rail 11 by a pair of links 23 and 24, links 23 being pivotally connected to legs 18 by rivets 25, links 24 to the front rail 11 by rivets 26, the links being connected together by rivets 27.

To one end of each of the side rails 13 there is secured hinge elements 28 that are identical to the hinge elements 16, and for the sake of clarity and the elimination of possible confusion, different numerals have been applied to the various parts of hinges 28. The arm portions 29 of the hinge elements 28 straddle the front rail 11 and they are pivotally connected thereto by rivets 30, the body of the hinge being rigidly secured to side rails 13 by rivets 28', the arcuate portion 31 adapted to engage the front rail 11 when in open position, while the arcuate portion 32 permits the side rails to be folded and lay flat when folded against the front rail.

Adjacent the opposite ends of the side rails 13 there is pivotally connected by rivets 33 the arm portions 34 of hinge elements 35, and it can be clearly seen how the arm portions straddle the side rails 13. The bodies 36 of the hinge elements 35 are rigidly secured to the rear legs 37 by rivets 37', and it is to be noted that legs 37 are shorter than legs 18. The legs 37 are connected to the side rails 13 by a pair of links 38 and 39, links 38 being pivotally connected to the legs 37 by rivets 40, links 39 to the side rails 13 by rivets 41, the links being connected by rivets 42.

The ends 43 of the side rails 13 may be formed into any desired configuration such as a V-shape, oblong, semi-round or round for a purpose to be later described. The ends 44 of the back rail 12 are formed into a recess 45 and the configuration of the recess may be U-shape, oblong, semi-square or semi-round to receive the ends 43 of the rails 13. In Figures 1, 2 and 4, the ends 44 of the back rail 12 are shown to be of U-shape configuration, and in Figures 2 and 4 the ends 43 of the side rails 13 are shown oblong. In Figure 7 the perspective view illustrates how the ends 43 of the side rails 13 engage the recess and lock the ends to the back rail.

The frame is provided with a covering 46 that may be of canvas or any other suitable material. As shown in Figures 2 and 3 the edges of the material are folded over and are secured by stitches 48 forming pockets 47 for the rails 11, 12 and 13, the pockets having cut out portions 50 that provide free movement of the legs, link connections and side rails without binding or interference with the covering 46.

In Figure 4 of the drawings the frame of the bed or bunk is shown in its opened, operative position in the rear seat area 54 of an automobile 55, the covering 46 being omitted from the frame for clarity. The bottom ends of legs 37 are engaged in apertures 56 of cross bar 57 that may be used on the rear seat frame as shown in Figure 4. It is to be noted that storage space is available at areas 58 and 59. If desired the frame may be of such a size to permit the front legs 18 and the front edge of the bed or bunk to rest against the back 60 of the front seat 61.

In Figures 10 and 11 I have shown a hinge element 65 that may if desired be used for locking the side rails 13 to the back rail 12. The hinge comprises arms 66 having apertures 67 and a tongue 68. The hinge is formed by bending the arms toward each other on the dotted lines 69, and the tongue 68 on the dotted line 70. As shown in Figure 11, the arms 66 are connected to side rails 71 by rivets 72, the socket formed by the hinge being engaged by the back rail 73.

In the reduced drawing Figure 8, I have shown a modified form of the present invention, wherein I have provided the front rail 11 with a pair of short legs 76 that are of the same length as the rear legs 37. The legs 76 are connected to the front rail by hinges 77, and by links 78 and 79, links 78 being pivotally connected to legs 76 by rivets 80, links 79 being pivotally connected to the front rail 75 by rivets 81, the links being connected together by rivets 82.

Hooks 83 may be provided on the back 60 of the front seat 61, and hooks 84 may be provided on the back 85 of rear seat 86 for suspending the bed by suitable slings 87 over the rear seat. With this construction the front legs may be folded with the rear legs open or rear legs folded and front legs open.

In using the present device, as shown in Figure 1 the bed is so designed that it may be folded into a very compact bundle. In Figure 2 the bottom of the bed is shown in a partially opened position illustrating how the front legs open with the pivotally mounted links 23 and 24, the rear legs being in a folded position. In Figure 3 the bottom side of the bed is illustrated, the frame being in full open position, the side rails 13 being locked in the recesses 45 of the rear rail 12, the front legs 18 and the rear legs being partially opened. In Figure 4 a side elevation of the frame is illustrated and it shows how the front frame is positioned in the rear area of a vehicle, with storage space between the bed and the top of an auto seat, and space between the back of the front seat and the front of the back seat.

In the use of the modified form of the invention shown in Figure 8, if it is desired to use the bed outside of a vehicle, legs 76 are opened and these legs are of a length equal to the length of the rear legs 37, thus providing a means for having the frame level, the legs 18 in this form of use would be folded against the front rail 11.

While the present invention has been disclosed in connection with certain specific embodiments thereof, it is to be understood that these are by way of example rather than by way of limitation, and that the invention is to be defined by the attendant claim which should be given a scope as broad as is consistent with the prior art.

I claim:

A collapsible child's bed for vehicles comprising rigid front, side and rear rails forming a frame, a cover on said frame, legs pivotally mounted to the front rail and offset from the ends of said rail, each side rail having one end pivotally connected to the front rail, said rear rail being detachable from the side rails, legs pivotally connected to the rear end of said side rails and shorter than the front legs, a socket on each end of said rear rail in locking engagement with the rear end of each of said side rails, a cross bar on a rear seat of a vehicle having transversely positioned recesses, said legs pivotally connected to said side rails having bottom ends engageable with the recesses in said cross bar.

JOHN W. MARTIN.

References Cited in the file of this patent

UNITED STATES PATENTS

| Number | Name | Date |
| --- | --- | --- |
| 633,525 | Martindale | Sept. 19, 1899 |
| 714,335 | Stanley | Nov. 25, 1902 |
| 1,375,100 | Lunostrom | Apr. 19, 1921 |
| 1,394,578 | Prucell | Oct. 25, 1921 |
| 1,544,277 | Smith | June 30, 1925 |
| 1,579,659 | Read | Apr. 6, 1926 |
| 2,128,018 | Skidmore | Aug. 23, 1938 |

FOREIGN PATENTS

| Number | Country | Date |
| --- | --- | --- |
| 478,862 | France | Oct. 19, 1915 |